US005853945A

United States Patent [19]

Yamane et al.

[11] Patent Number: 5,853,945

[45] Date of Patent: Dec. 29, 1998

[54] HIGH-CONTRAST SILVER HALIDE PHOTOGRAPHIC MATERIAL AND PHOTOGRAPHIC IMAGE FORMING SYSTEM USING THE SAME

[75] Inventors: Katsutoshi Yamane; Nobuyuki Iwasaki, both of Kanagawa, Japan

[73] Assignee: Fuji Photo Film Co., Ltd., Minami Ashigara, Japan

[21] Appl. No.: 867,419

[22] Filed: Jun. 2, 1997

[30] Foreign Application Priority Data

| | | | |
|---|---|---|---|
| Jun. 3, 1996 | [JP] | Japan | 8-140245 |
| Aug. 22, 1996 | [JP] | Japan | 8-221396 |
| Aug. 22, 1996 | [JP] | Japan | 8-238646 |

[51] Int. Cl.[6] .............................. G03C 5/16; G03C 1/46; C09K 11/84

[52] U.S. Cl. .......................... 430/139; 430/509; 430/583; 430/966; 252/301.45

[58] Field of Search .................................... 430/139, 509, 430/583, 966; 252/301.45

[56] References Cited

U.S. PATENT DOCUMENTS

| | | | |
|---|---|---|---|
| 4,710,637 | 12/1987 | Luckey et al. | 250/486.1 |
| 5,217,647 | 6/1993 | Tono et al. | 252/301.4 S |
| 5,290,655 | 3/1994 | Iwasaki | 430/139 |
| 5,639,591 | 6/1997 | Adachi | 430/567 |
| 5,759,754 | 6/1998 | Dickerson | 430/502 |

FOREIGN PATENT DOCUMENTS

| | | | |
|---|---|---|---|
| 347798 | 12/1989 | European Pat. Off. | G03C 5/16 |
| 1-179145 | 7/1989 | Japan | G03C 1/46 |
| 7-18956 B2 | 1/1995 | Japan | G21K 4/00 |
| 7-43861 | 2/1995 | Japan | G03C 5/17 |
| 93/01522 | 1/1993 | WIPO | G03C 5/17 |

*Primary Examiner*—Mark F. Huff
*Attorney, Agent, or Firm*—Burns, Doane, Swecker & Mathis, LLP

[57] ABSTRACT

A silver halide photographic material for mammography comprising a support having on one side thereof at least two light-sensitive emulsion layers different in sensitivity, in which the uppermost emulsion layer is less sensitive than the lower emulsion layer, the total silver content of all light-sensitive emulsion layers is from 2.0 to 5.5 g/m$^2$, and the silver halide light-sensitive material exhibits an average contrast of from 3.6 to 4.8 and a sensitivity of from 0.03 to 0.07 lux.sec. when developed as specified; and an X-ray photographic image forming system for mammography comprising (A) a single-sided silver halide light-sensitive material and (B) an X-ray intensifying screen having a layer substantially comprising a $Gd_2O_2S$:Tb fluorescence substance, in which the screen has an emission luminance of 150 to 250 and a contrast transfer function of from 0.40 to 1.00 at a spatial frequency of 5 line pairs/mm, the silver halide light-sensitive material has an average contrast of 3.6 to 4.8, and the X-ray photographic image forming system has a system sensitivity of 5.5 to 10 mR.

11 Claims, No Drawings

HIGH-CONTRAST SILVER HALIDE PHOTOGRAPHIC MATERIAL AND PHOTOGRAPHIC IMAGE FORMING SYSTEM USING THE SAME

FIELD OF THE INVENTION

This invention relates to a novel silver halide photographic material and a combination of the silver halide photographic material and a radiographic intensifying screen. More particularly, it relates to a silver halide photographic material and a photographic image forming system using the same which provides an excellent image in the field of mammography using low-energy X-rays generated at a tube voltage of 40 kVp or less.

BACKGROUND OF THE INVENTION

In recent years, the incidence of breast cancer has been increasing, posing a social problem. Breast cancer is examined by palpation, ultrasonography, breast X ray photography called mammography, and the like. In particular, mammography using a fluorescent screen has been proving useful. The development in breast diagnostic systems is reviewed, e.g., in *Phy. Med. Biol.*, Vol. 41, p. 315 (1996).

X-Ray photography using a fluorescent screen has enjoyed wide use for taking chest, stomach and gastric X rays in the medical field. In particular, mammography is ranked special from the standpoint of development of the screen/silver halide photographic material system. That is, an X-ray picture of the breast is taken by low-energy X-rays generated at a tube voltage of 40 kVp or less, which is of rare use in general X-ray photography, in order to compensate for low contrast of an object in the breast. Further, very high sharpness is required of an X-ray picture because a calcification as small as several hundreds of microns must be observed. Since mammography thus employs a different radiation source and requires different performance from those for general X-ray photography, the performance and design required of the screen/silver halide photographic material system are naturally different from others'. The techniques developed for general X-ray photography being of little help, every manufacturer has been developing and selling their systems exclusive for the use in mammography, and various attempts of improvement have been reported.

U.S. Pat. No. 4,914,303 reports a screen for mammography which has an improved distribution of a fluorescence substance particles to reduce structural noise. JP-B-7-18955 (the term "JP-B" as used herein means an "examined published Japanese patent application") discloses a method for obtaining a screen of high quality by optimizing the dye distribution in a fluorescence substance layer. These proposals consist in improvement on a screen only, and the improvements attained are on the same level of currently available commercial products and are still insufficient.

Silver halide photographic materials for mammography are disclosed in JP-A-1-179145 and JP-A-5-45807 (corresponding to U.S. Pat. No. 5,290,655) (the term "JP-A" as used herein means an "unexamined published Japanese patent application"). They are also deemed still insufficient, and further improvement has been keenly demanded. Besides, these proposals consist in improvement on a light-sensitive material only. As far as this line of approach is taken, the levels reached by the above proposals seem to be the limit. As is apparent from the working examples of the publications, the contrast of the disclosed light-sensitive materials is 3.6 at the highest. In other words, none of the conventional techniques has succeeded in producing such a high-contrast light-sensitive material as proved useful in the present invention. On the other hand, a demonstration of a novel light-sensitive material was given by Eastman Kodak Co. in '96 Exhibition of the JMCP, but the contrast exhibited by the material was no higher than 3.5, which is no better than the level of conventional systems.

Although a high-contrast light-sensitive material has been sought as stated above, it is deemed technologically difficult to produce a high-contrast light-sensitive material in the above-mentioned sensitivity range. In addition, the inventors of the present invention has revealed it unfavorable to raise the contrast to 3.6 or higher as far as the conventional line of approach is followed. This is because such an approach results in deterioration of graininess below a permissible level as will be demonstrated in Examples hereinafter given.

Thus, although there is a great demand for improvement in diagnostic ability of mammography, we have not found out a new direction to develop in.

On the other hand, JP-B-7-18956 reports an attempt to obtain high image quality in which a single-sided emulsion film for mammography which is usually used in combination with a single intensifying screen is used in combination with two intensifying screens in the front and the back. However, the disclosed both-sided system involves ambiguity caused by crossover light, incorporation of scattered light, and adverse influences by too a thin front intensifying screen, failing to achieve substantial advancement. While some specific examples of the intensifying screen are given in Examples of the above publication, they are strongly colored, or the fluorescence substance has a large particle size. If these screens are used individually on one side of the film, they will show no improvement in luminance and sharpness required of an intensifying screen, being on the same level as those using niobium-activated yttrium tantalate which have an emission luminance close to that of the disclosed screens. Therefore, the technique is different from the present invention in the concept of design.

JP-A-2-97640 (corresponding to EP 3477984) suggests a system using a film comprising a support having coated thereon both a fluorescence substance layer and a light-sensitive layer. Such a system incapable of reusing the fluorescence substance is costly for X-ray photography and seems to be impractical for mass-screening.

While not intended for mammography, JP-A-7-43861 and WO94-01522 teach a high-sharpness system using a single-sided film. The sharpness of the system of JP-A-7-43861 is insufficient for mammographical use, and the standpoint of designing a high-contrast film is not incorporated into the concept. WO93-01522 uses an ultraviolet-emitting fluorescence substance. Although the system can be designed to achieve high sharpness, a satisfactory system for mammography would not be worked out by an extension of this system as will be explained later.

Thus, none of the various attempts made to date resulted in sufficient effect and has not come into wide use on the market. Therefore, in the field of mammography having the peculiarity of using low-energy X-rays, establishment of a high-quality image formation system has been keenly sought for correct diagnosis.

SUMMARY OF THE INVENTION

An object of the present invention is to provide a combination of a silver halide photographic material and an intensifying screen which constitutes a novel and excellent X-ray photographic image forming system showing an adequate balance between image quality and sensitivity.

Another object of the invention is to provide a silver halide photographic material constituting a novel and excellent X-ray photographic image forming system for mammography.

The above objects of the invention are accomplished by the following embodiments.

(1) A silver halide photographic material for photographing soft tissues using low-energy X-rays generated at a tube voltage of not more than 40 kV which comprises a support having on one side thereof a light-sensitive emulsion layer, in which the support has on one side thereof at least two light-sensitive emulsion layers different in sensitivity, the uppermost emulsion layer being less sensitive than the lower emulsion layer, the total silver content of all the light-sensitive emulsion layers is from 2.0 to 5.5 g/m$^2$, and the silver halide photographic material exhibits an average contrast of from 3.6 to 4.8 and a sensitivity of from 0.03 to 0.07 lux.sec. when developed with a developer (G) having the following formulation at 35° C. for 25 seconds (hereinafter referred to as development processing (1)) Formulation of Developer (G):

| | |
|---|---|
| Potassium hydroxide | 21 g |
| Potassium sulfite | 63 g |
| Boric acid | 10 g |
| Hydroquinone | 25 g |
| Triethylene glycol | 20 g |
| 5-Nitroindazole | 0.2 g |
| Glacial acetic acid | 10 g |
| 1-Phenyl-3-pyrazolidone | 1.2 g |
| 5-Methylbenzotriazole | 0.05 g |
| Glutaraldehyde | 5 g |
| Potassium bromide | 4 g |
| Water to make | 1 l |
| pH adjusted to | 10.2 |

(2) A silver halide photographic material according to (1), wherein said average contrast is from 3.8 to 4.5.

(3) A silver halide photographic material according to (1) to (2), wherein the uppermost light-sensitive emulsion layer contains both a green sensitizing dye and a blue sensitizing dye.

(4) A silver halide photographic material according to (1) to (3), which contains a compound represented by formula (I):

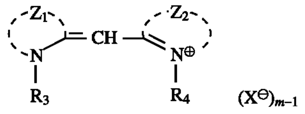

(I)

wherein Z$^1$ and Z$^2$ each represents an atomic group necessary to complete a thiazole ring, a thiazoline ring, an oxazole ring, a selenazole ring, a 3,3-dialkylindolenine ring, an imidazole ring or a pyridine ring; R$^3$ and R$^4$ each represents an alkyl group; X$^-$ represents an anion; and m represents 1 or 2; when m is 1, the compound forms an inner salt.

(5) An X-ray photographic image forming system (a radiographic system) comprising a silver halide photographic material according to (1) to (4) and an intensifying screen having a fluorescence layer substantially comprising a $Gd_2O_2S$:Tb fluorescence substance, wherein said X-ray photographic image forming system has a system sensitivity of from 5.5 to 10 mR.

(6) An X-ray photographic image forming system according to (5), wherein the fluorescence layer is not substantially colored and has a fluorescence substance content of 25 to 100 mg/cm$^2$.

(7) An X-ray photographic image forming system according to (5) to (6), wherein said intensifying screen has a contrast transfer function (CTF) of from 0.40 to 1.00 at a spatial frequency of 5 line pairs/mm.

(8) An X-ray photographic image forming system for mammography using low-energy X-rays generated at a tube voltage of not more than 40 kV, which comprises:

(A) a silver halide photographic material comprising a support having only on one side thereof a light-sensitive layer; and (B) an intensifying screen having a fluorescence layer substantially comprising a $Gd_2O_2S$:Tb fluorescence substance, wherein said screen has an emission luminance of 150 to 250 and a contrast transfer function (CTF) of from 0.40 to 1.00 at a spatial frequency of 5 line pairs/mm, and said silver halide photographic material has an average contrast of 3.6 to 4.8 when subjected to the development processing (1)), and said X-ray photographic image forming system has a system sensitivity of 5.5 to 10 mR.

(9) An X-ray photographic image forming system for mammography according to (8), wherein the fluorescence layer is not substantially colored and has a fluorescence substance content of 25 to 100 mg/cm$^2$.

(10) An X-ray photographic image forming system for mammography according to (8) to (9), wherein said contrast transfer function is 0.45 to 1.0.

(11) An X-ray photographic image forming system for mammography according to (8) to (10), wherein said average contrast is 3.8 to 4.8.

DETAILED DESCRIPTION OF THE INVENTION

The terminology "average contrast (gradient)" as used herein for a silver halide light-sensitive photographic material (hereinafter sometimes referred to as "light-sensitive material) developed according to development processing (1) means the slope of the straight line connecting the point of (fog density+0.25) and the point of (fog density+2.0) in a characteristic curve depicted on rectangular coordinates having equal unit lengths with the logarithm of an X-ray exposure plotted as abscissa and an optical density as ordinate, i.e., tan θ (θ=the angle between the straight line and the abscissa).

The terminology "sensitivity" as used herein for a silver halide photographic material developed according to development processing (1) means an exposure (lux.sec) necessary to give an optical density of (fog density+1.0) when the light-sensitive material is exposed to monochromatic light having a wavelength of 545 nm and a half value width of 20 nm and subjected to development processing (1).

The terminology "system sensitivity" as used herein for a photographic image forming system developed according to development processing (1) means a dose of radiation necessary to give an optical density of (fog density+1.0) when the photographic image forming system is exposed to X-rays emitted from an Mo target tube run at 26 kVp in a three-phase system and having passed through 1 mm of Be, 0.03 mm of Mo, and a 2 cm thick acrylic resin filter and developed according to development processing (1).

A characteristic curve of a light-sensitive material can be obtained as follows. In mammography, while an Mo target tube emitting low-energy X-rays is usually used for exposure, a characteristic curve obtained by using a tungsten target tube as a ray source while varying an X-ray exposure according to a distance method is substantially equal to that obtained by using an Mo target tube provided that the film is combined with an intensifying screen substantially comprising a $Gd_2O_2S$:Tb fluorescence substance.

Specifically, a characteristic curve was obtained by using X-rays generated from a tungsten target tube run at 50 kVp in a three-phase system and having passed through a 3 mm thick aluminum plate. A light-sensitive material is brought into intimate contact with a commercially available intensifying screen (UM-Fine, produced by Kasei Optonics K.K.) and put into a cassette (ECMA Cassette, produced by Fuji Photo Film Co., Ltd.). The cassette was set in front of an X-ray tube in the order of the cassette plate, the film, and the screen. The film is irradiated with X-rays at an exposure increasing stepwise by logE=0.15 according to a distance method.

The exposed film is developed on an automatic processor (FPM-5000, manufactured by Fuji Photo Film Co., Ltd.) with developer (G) at 35° C. for 25 seconds (RP processing). The optical density is plotted as ordinate against logE as abscissa to give a characteristic curve. The average contrast is obtained as a slope of the straight line connecting the point of (fog+0.25) and the point of (fog+2.0) in the characteristic curve (tan θ taking the angle between the straight line and the abscissa as θ).

The sensitivity of a light-sensitive material can be measured as follows. Monochromatic light of 545 nm can be obtained by means of a filter system composed of interference filters. According to this method, monochromatic light having a requisite exposure and a half value width of 20±5 nm can easily be obtained while depending on the combination of interference filters.

A combination of a tungsten light source (color temperature: 2856° K) and a filter having a transmission peak wavelength of 545 nm and a half value width of 20 nm can be mentioned as an example of a light source. The thus isolated monochromatic light, with its illuminance correctly measured with a previously collected illuminometer, is given to a light-sensitive material at a distance of 1 m through a discontinuous neutral density filter for 1 second. The exposed film is developed by development processing (1), and the density is measured to obtain an exposure necessary to provide a density of (fog+1.0) (sensitivity; lux.sec).

The details of the standard conditions for development processing (1) are as follows.

Development time: 25 sec. (21 sec. in liquid+4 sec. out of liquid before entering a fixing solution)

Fixing time: 20 sec. (16 sec. in liquid+4 sec. out of liquid before entering washing water; the fixing solution has the following formulation.)

Washing: 12 sec.

Squeegee and drying: 26 sec.

Formulation of fixing solution (F):

| | |
|---|---|
| Ammonium thiosulfate (70 w/v %) | 200 ml |
| Sodium sulfite | 20 g |
| Boric acid | 8 g |
| Disodium ethylenediaminetetraacetate dihydrate | 0.1 g |
| Aluminum sulfate | 15 g |
| Sulfuric acid | 2 g |
| Glacial acetic acid | 22 g |
| Water to make | 1 l |
| pH (adjusted with sodium hydroxide or glacial acetic acid, if necessary) | 4.5 |

Developing equipment: A commercially available roller transport system automatic processor (e.g., FPM-5000 manufactured by Fuji Photo Film Co., Ltd.; development tank: 22 l-volume, 35° C.; fixing tank: 15.5 l-volume, 25° C.).

M-6AW manufactured by Eastman Kodak Co. is another example of the same type of roller transfer system automatic processors.

The silver halide photographic material according to the present invention has an average contrast of 3.6 to 4.8, preferably 3.8 to 4.8, still preferably 3.8 to 4.5, further preferably 3.9 to 4.4. A preferred sensitivity (an exposure necessary to provide an optical density of (fog+1.0)) of the light-sensitive material is 0.03 to 0.07 lux.sec, particularly 0.03 to 0.05 lux.sec, especially 0.035 to 0.05 lux.sec.

The method for obtaining a light-sensitive material having the above-described characteristic curve is arbitrary. A typical example of the method is shown below.

Two kinds of emulsions having different grain sizes (different sensitivities) are selected. The difference in sensitivity is preferably in the range of 0.15 to 0.5 in terms of logE. A particularly preferred range of the difference is from 0.2 to 0.4. An emulsion having lower sensitivity is applied as an upper layer, and an emulsion having higher sensitivity as a lower layer. While a higher contrast is obtained by applying three or more emulsions different in sensitivity in the descending order of sensitivity from the top to the bottom, providing four or more emulsion layers has little significance taking into consideration the balance between effect and economy. It is preferable for the upper emulsion layer to have a smaller green light absorption than the lower emulsion layer. In this connection, a combined use of a green sensitizing dye and a blue sensitizing dye in the uppermost layer brings about satisfactory results.

While not limiting, each emulsion layer has substantially the same silver content.

The silver halide grains of the emulsions preferably have a mono-dispersed size distribution. Emulsions having such a narrow grain size distribution as has a coefficient of variation of not greater than 20%, particularly not greater than 15%, are preferred, the coefficient of variation being obtained by dividing a deviation of a grain size by a mean grain size and multiplying the quotient by 100.

While the shape and halogen composition of the silver halide grains are arbitrary, tabular grains and ammoniacal cubic grains are particularly useful. In order to increase the contrast, the silver halide grains can contain 1 to 3 mol % of silver iodide, but a low silver iodide content is preferred from the standpoint of processing stability.

In mammography, control on photographic density after photographic processing is generally accepted to be of importance. In other words, an exposure equipment, a developing solution, and the like must be under control so as to always provide an equal density with the photographing conditions being equal. Variation in sensitivity due to daily changes occurring in processing solutions is magnified into large variation in density particularly in high-contrast light-sensitive materials as used in the present invention. Therefore, it is a very important property for the light-sensitive material of the present invention not to be subject to variation in sensitivity and gradation against slight changes of processing solutions.

According to the inventors' study, a preferred iodide content of silver halide grains for satisfying the above requirement is as low as 1.5 mol % at the most, particularly up to 0.8 mol %, especially up to 0.3 mol %. Such a low iodide content is also favorable to markedly reducing so-called roller marks (black spot unevenness caused by rollers of an automatic processor) and residual dyes remaining after processing.

To suppress variation in density with variation of processing solutions, it is also preferable for the emulsions to be selenium sensitized, particularly selenium-sulfur-gold sensitized. A preferred amount of a selenium sensitizer to be added is $5\times10^{-7}$ to $2\times10^{-5}$ mol, particularly $1\times10^{-6}$ to $1\times10^{-5}$ mol, per mole of silver.

Of the two or more emulsions, the one used as an upper layer preferably contains a blue-absorbing dye in addition to a green-absorbing dye so as to have a reduced green absorption. In particular, addition of a green-absorbing dye and a blue-absorbing dye to the emulsion prior to chemical sensitization results in optimizing the subsequent chemical sensitization, providing a high-sensitivity and high-contrast emulsion.

While not limiting, green sensitizing dyes to be used include those represented by formula (II):

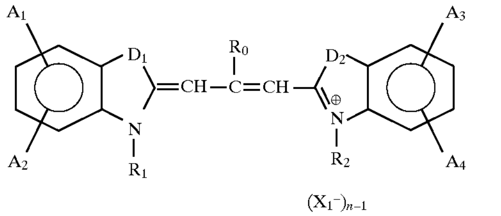

(II)

wherein $A_1$, $A_2$, $A_3$, and $A_4$ each represents a hydrogen atom, a lower alkyl group, an alkoxy group, a halogen atom, a hydroxyl group, an aryl group, a carboxyl group, an alkoxycarbonyl group, a cyano group, a trifluoromethyl group, an amino group, an acylamido group, an acyl group, an acyloxy group, an alkoxycarbonylamino group or a carboalkoxy group; $A_1$, and $A_2$, or $A_3$ and $A_4$ may be connected to each other to form a naphthoxazole ring; $R_0$ represents a hydrogen atom, a lower alkyl group or an aryl group; $D_1$ and $D_2$ each represents an oxygen atom or a sulfur atom; $R_1$ and $R_2$ each represents an alkyl group, at least one of them being an alkyl group having a sulfo radical; $X_1$ represents an anion; and n represents 1 or 2; when n is 1, the dye forms an inner salt.

Specific but non-limiting examples of useful green sensitizing dyes are shown below.

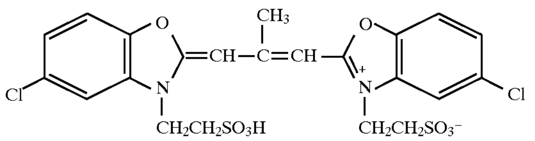

2-1

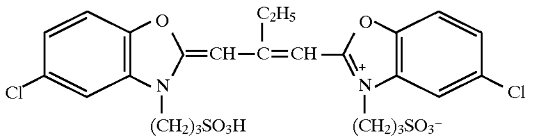

2-2

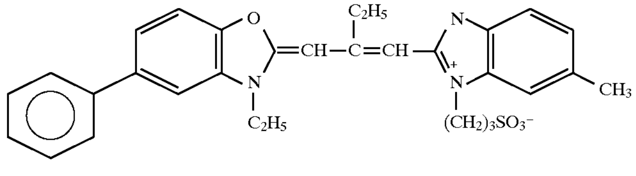

2-3

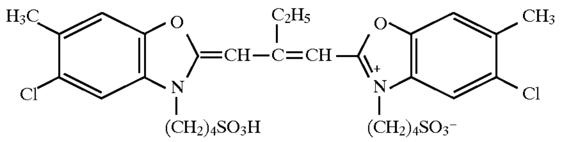

2-4

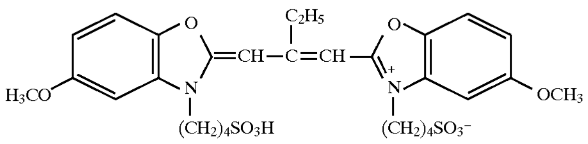

2-5

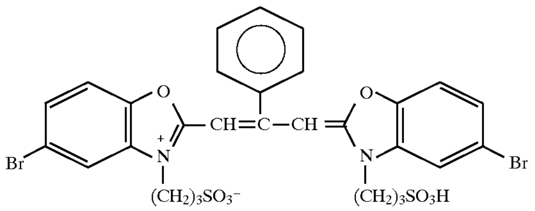

2-6

-continued

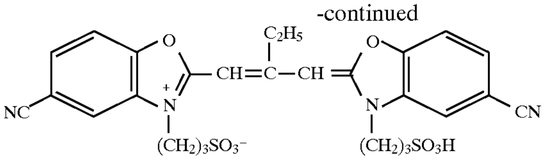

2-7

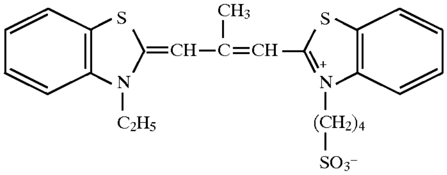

2-8

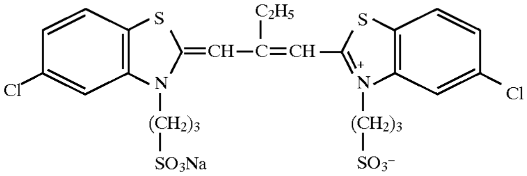

2-9

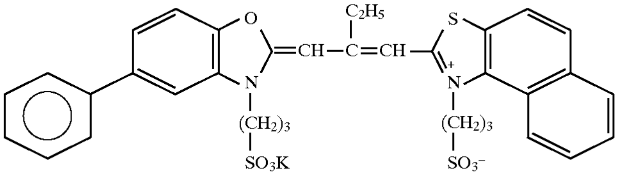

2-10

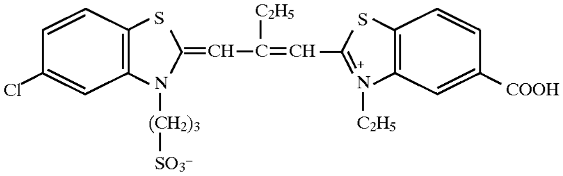

2-11

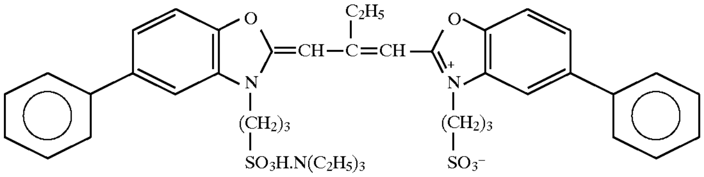

2-12

The green sensitizing dye is-preferably used in an amount of 100 to 1000 mg, particularly 150 to 800 mg, per mole of silver.

The blue sensitizing dyes include monomethine dyes. The blue sensitizing dye is used in an amount of 50 to 600 mg, particularly 100 to 400 mg, per mole of silver.

The silver halide photographic material according to the present invention preferably contains a compound represented by formula (I):

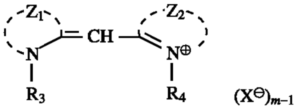

(I)

wherein $Z^1$ and $Z^2$ each represent an atomic group necessary to complete a thiazole ring, a thiazoline ring, an oxazole ring, a selenazole ring, a 3,3-dialkylindolenine ring, an imidazole ring or a pyridine ring; $R^3$ and $R^4$ each represent an alkyl group; $X^-$ represents an anion; and m represents 1 or 2; when m is 1, the compound forms an inner salt.

The addition of the compound represented by formula (I) is effective in controlling the toe-gradation of the characteristic curve to improve the contrast.

Specific but non-limiting examples of the compound of formula (I) are shown below.

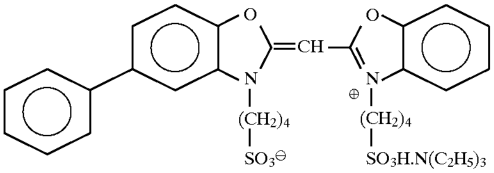

1-1

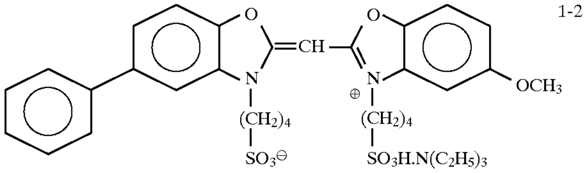

1-2

-continued 1-3

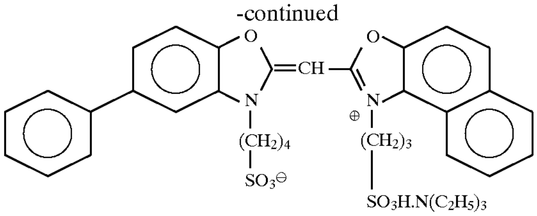

1-4

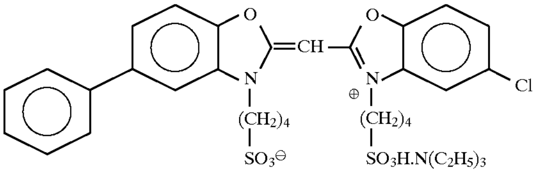

1-5

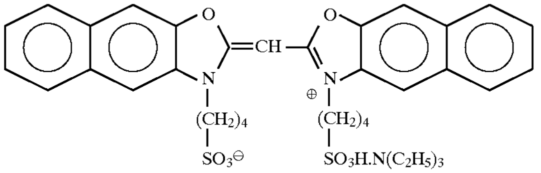

1-6

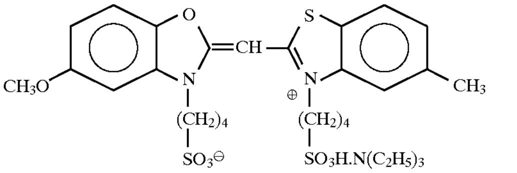

The compound of formula (I) is preferably used in an amount of 50 to 1000 mg, particularly 100 to 800 mg, per mole of silver.

The silver halide photographic material for use in the present invention typically has a structure comprising a transparent support having on one side thereof two or more emulsion layers and on the other side a light-insensitive gelatin layer containing a dye.

The support is made of a transparent material, such as polyethylene terephthalate, and tinted with a blue dye. Various kinds of blue dyes can be used, including anthraquinone dyes known for X-ray films. The support has a thickness of 160 to 200 μm. Similarly to ordinary X-ray films, a subbing layer comprising a water-soluble polymer, such as gelatin, is provided on the support.

A dye layer for antihalation can be provided on the subbing layer. It is usually desirable that the dye layer be formed as a dye-containing colloid layer and be decolored by the above-specified development processing. In the dye layer the dye is preferably fixed in the lower part of the layer so as not to diffuse into the upper layers, such as the emulsion layers and a protective layer.

On the dye layer are formed light-sensitive silver halide emulsion layers. While common silver halide emulsions are sensitive to light in the region of from blue light to ultraviolet light, the emulsions for use in the present invention must be sensitive to the light emitted from an intensifying screen used in combination. Since the light emitted from an intensifying screen comprising terbium-activated Gadolinium oxysulfide ($Gd_2O_2S$:Tb) as a fluorescence substance has a dominant wavelength of 545 nm, the silver halide emulsions to be used in the invention must be spectrally sensitized to green light.

The light-sensitive emulsion layer preferably contains a binder in a proportion of not more than 5 $g/m^2$, particularly from 2 to 5 $g/m^2$, especially 2 to 4 $g/m^2$, and preferably has a silver content of 2 to 5.5 $g/m^2$, particularly 2 to 5 $g/m^2$, especially from 2.5 to 4.5 $g/m^2$.

On the light-sensitive emulsion layer is further provided a protective layer comprising a water-soluble polymer, such as gelatin, in a conventional manner thereby to obtain a silver halide photographic material according to the present invention.

Emulsion sensitization methods, additives, constituting materials, development processing, and the like for the practice of the present invention are not particularly limited. For example, the information given in the following publications can be referred to.

1. Chemical Sensitization
   JP-A-2-68539, p. 10, upper right column (URC), l. 13 to lower left column (LLC), l. 16
2. Antifoggant and Stabilizer
   ibid, p. 10, LLC, l. 17 to p. 11, upper left column (ULC), l. 7, and p. 3, LLC, l. 2 to p. 4, LLC
3. Spectral Sensitizing Dye
   ibid, p. 4, lower right column (LRC), l. 4 to p. 8, LRC
4. Surface Active Agent and Antistatic Agent ibid, p. 11, ULC, l. 14 to p. 12, ULC, l. 9
5. Matting Agent, Slip Agent and Plasticizer ibid, p. 12, ULC, l. 10to URC, l. 10; ibid, p. 14, LLC, l. 10 to LRC, l. 1
6. Hydrophilic Colloid ibid, p. 12, URC, l. 11 to LLC, l. 16
7. Hardener ibid, p. 12, LLC, l. 17 to p. 13, URC, l. 6
8. Support ibid, p. 13, URC, 11. 7–20
9. Dye and Mordant ibid, p. 13, LLC, l. 1 to p. 14, LLC, l. 9
10. Development Processing
   JP-A-2-103037, p. 16, URC, l. 7 to p. 19, LLC, l. 15;
   JP-A-2-115837, p. 3, LRC, l. 5 to p. 6, URC, l. 10

The intensifying screen which can be used in the present invention will be described below in detail.

The X-ray intensifying screen for use in the photographic image forming system for mammography is required to provide higher resolution as compared with those used for chest X-raying. Commercially available X-ray intensifying screens have a colored fluorescence substance layer to have increased resolution. However, such coloring hinders effective utilization of the light emitted from the fluorescence substance located in the area farther from the surface of X-ray incidence. The X-ray intensifying screen practical for use in the present invention is required to have a sufficient amount of a fluorescence substance enough for sufficient X-ray absorption-to ensure sufficient sharpness without coloring the fluorescence substance layer (fluorescence layer).

In order to accomplish the above object, it is preferable for the fluorescence substance to have a controlled particle size below a given size. The particle size of a fluorescence substance can be measured with a Coulter counter or by observation under an electron microscope. The fluorescence substance preferably has an average sphere-equivalent diameter of from 1 to 5 μm, particularly from 1 to 4 μm, as so measured. Such a limited particle size is of no significance for conventional screens for mammography having a dyed fluorescence substance layer but is of significance for the screens whose fluorescence substance layer is not substantially dyed as in the present invention.

In order to obtain increased sharpness from such a screen, a ratio of a binder to a fluorescence substance in the layer is preferably small. A preferred binder to fluorescence substance ratio is 1/50 to 1/20, particularly 1/50 to 1/25, by weight.

Any known binder as described in JP-A-6-75097, page 4, right column, line 45 to page 5, left column, line 10 can be used. In particular, thermoplastic elastomers having a softening point or a melting point of 30° to 150° C. are preferably used either alone or in combination with other binder resins. Because a screen having a reduced proportion of a binder for increasing sharpness as used in the present invention is to have reduced durability, it is preferable to select a binder capable of compensating for the lack of durability. It is a preferred approach therefor to select a binder with sufficient softness. It is also preferable to add a plasticizer, etc. to the fluorescence substance layer. Suitable thermoplastic elastomers include polystyrene, polyolefins, polyurethane, polyester, polyamide, polybutadiene, ethylene vinyl acetate, natural rubber, fluorine rubber, polyisoprene, chlorinated polyethylene, styrene-butadiene rubber, and silicone rubber. Polyurethane is particularly preferred. Selection of a binder to be used in a subbing layer for a fluorescence substance layer is also of importance. Acrylic resins are preferred for this use.

It is preferable that a protective layer of the screen be as thin as possible as is consistent with resistance to scratches and contamination. A preferred thickness of the protective layer is 1 to 7 μm, particularly 2 to 7 μm, especially 2 to 4 μm.

The protective layer can be provided by laminating a film of polyethylene terephthalate (PET) (especially a stretched PET film), PEN, nylon, etc. The protective layer can also be formed by applying a fluorine-containing resin as dissolved in a solvent, which is preferred for prevention of contamination. For the details of useful fluorine-containing resins, refer to JP-A-6-75097, page 6, left column, line 4 to right column, line 43. Other resins that can be applied together with a solvent to form a surface protective layer include polyurethane resins, polyacrylic resins, cellulose derivatives, polymethyl methacrylate, polyester resins, and epoxy resins.

Equally significant for obtaining high sensitivity and high sharpness, the fluorescence substance is used at a high packing density. Specifically, the packing density of a fluorescence substance is preferably 60 to 80%, still preferably 65 to 80%, by volume. In order to obtain a high packing density with fine particles as used herein, the technique of compressing a fluorescence substance layer as disclosed in JP-A-6-75097, page 4, right column, line 29 to page 6, left column, line 1 is preferably used.

It is preferable that the fluorescence substance to be used in the present invention substantially comprises $Gd_2O_2S$:Tb. The term "substantially" as used herein is intended to mean that the fluorescence substance comprises $Gd_2O_2S$:Tb as a main component and can contain up to several percents of additives for performance improvement or silica for surface modification. Y, La or Lu may be used in place of up to several tens of percents of Gd.

In general, a fluorescence substance preferably has a large density for effective X-ray absorption. Such fluorescence substances exhibiting high absorptivity for X-rays emitted from a ray source used in mammography include $Gd_2O_2S$:Tb and, in addition, $YTaO_4$ to which an activator as a luminescence center may be added, $CaWO_4$, BaFBr:Eu, etc.

It is necessary for the fluorescence substance to have high emission efficiency in order to achieve the object of this invention. As stated above, the silver halide photographic material for mammography should have high gradation or contrast. It is technologically difficult to obtain a light-sensitive material which has high contrast and yet high sensitivity. Accordingly, in order to obtain satisfactory results even though a light-sensitive material has low sensitivity, it is preferable that the intensifying screen to be combined with has a high emission luminance. It would be difficult to obtain an image of high contrast with other fluorescence substances having low emission efficiency. It is also important for obtaining a high contrast image that the light-sensitive material has sufficiently low light absorption. As previously described in detail, if a light-sensitive material, particularly the uppermost emulsion layer thereof, exhibits high light absorption, the layer produces a shielding effect to make the image softer. In particular since the light-sensitive material of the present invention has a silver halide emulsion on only one side thereof unlike general films for chest X-rays, the emulsion is applied to an increased coating thickness, resulting in a noticeable shielding effect. In designing such a single-sided high-contrast light-sensitive material, it is extremely important to control the light absorption of the material sufficiently low. If a fluorescence substance emitting light in the ultraviolet to blue region is used, because silver halide exhibits its characteristic absorption in this region, the light-sensitive material tends to exhibit too strong absorption or the absorption is difficult to control. Accordingly, it is preferable to spectrally sensitize silver halide to control the absorption and to use a fluorescence substance whose emission peak agrees with the absorption wavelength.

The conclusion derived from all these viewpoints is that a fluorescence substance preferred and practical for use in the present invention is $Gd_2O_2S$:Tb. Other fluorescence substances, such as $YTaO_4$, $YTaO_4$ to which an activator as a luminescence center has been added, $CaWO_4$, and BaFBr:Eu, do not serve for designing the system of the present invention.

Since the intensifying screen for mammography which can be preferably used in the present invention is required to absorb X-rays sufficiently, the fluorescence substance is preferably applied to a coating weight of 25 to 100 $mg/cm^2$, particularly 25 to 80 $mg/cm^2$. For effective utilization of luminescence by X-rays absorbed by the fluorescence substance, it is preferable that the fluorescence substance layer be not substantially colored. To decrease the coating weight of a fluorescence substance or to color a fluorescence substance layer is generally adopted in high sharpness screens for mammography for the purpose of improving the sharpness, but such manipulations are disadvantageous in that the X-ray quantum number available for image formation decreases. Thus, it is desirable that an intensifying screen be capable of absorbing as much X-ray as possible and that the light emitted from the fluorescence substance on X-ray absorption be utilized as much as possible. The emission luminance of a screen can be taken as a measure representing the efficiency of X-ray absorption and emitted light utilization.

The emission luminance of a screen as referred to herein is defined as follows, using a single-sided silver halide photographic material having a sensitivity of 0.0210 lux.sec as measured after development processing (1). The light-sensitive material and a screen are brought into intimate contact, and the combination is exposed to X-rays emitted from an Mo target tube run at 26 kVp in a three-phase system and having passed through 1 mm of Be, 0.03 mm of Mo, and a 2 cm thick acrylic resin filter. The exposed light-sensitive material is developed according to development processing (1). The emission luminance of the screen is defined to be the inverse of the exposure necessary to provide an optical density of (fog+1.0). The thus obtained emission luminance is relatively expressed taking the luminance of a screen at an X-ray dose of 7.2 mR (0.139 $mR^{-1}$) as a standard (100).

The screen according to the invention substantially uses $Gd_2O_2S$:Tb as a fluorescence substance and shows luminescence exhibiting a dominant emission peak at 545 nm. Accordingly, the silver halide photographic material to be combined with the screen should be one having been spectrally sensitized to light at 545 nm. Orthochromatic films for mammography having a silver halide emulsion layer on one side thereof sold by manufacturers of photographic materials can be made use of, provided that the sensitivity of the film is measured according to the following method.

A combination of a tungsten light source (color temperature: 2856° K) and a filter having a transmission peak wavelength of 545 nm and a half value width of 20 nm is used a light source. The thus isolated monochromatic light, with its illuminance correctly measured with a previously corrected illuminometer, is given to a light-sensitive material at a distance of 1 m through a discontinuous neutral density filter for 1 second. The exposed film is developed by development processing (1), fixed, and dried, and the density is measured to obtain an exposure necessary to provide a density of (fog+1.0) (sensitivity; lux.sec). The one-sided light-sensitive material for mammography which can be used for determining the above-identified emission luminance of a screen is one having an exposure (sensitivity) of 0.0210 lux.sec as measured above. When the measured sensitivity deviates from the above value, the deviation can be corrected for use. Useful light-sensitive materials include UMMA-HC Films produced by Fuji Photo Film Co., Ltd. For example, UMMA-HC #919-01 had a sensitivity of 0.0210 lux.sec as measured after development processing (1).

The emission luminance of a screen can be measured as follows by using the above-described light-sensitive material having a sensitivity of 0.0210 lux.sec (UMMA-HC #919-01). The film and a screen are brought into intimate contact, and the film side of the combination is exposed to X-rays emitted from an Mo target tube run at 26 kVp in a three-phase system and having passed through about 1 mm of Be, 0.03 mm of Mo, and a 2 cm thick acrylic resin filter for about 1 second. At the same time, the X-ray dose is measured with an ionization dosimeter. The exposed film is developed according to development processing (1). The exposure to X-rays and subsequent development are repeated while varying the current of the X-ray tube and the exposure time from 0.5 to 1.5 seconds to obtain an X-ray dose providing an optical density of (fog+1.0). The inverse of the X-ray dose is taken as an emission luminance. The thus obtained emission luminance is relatively expressed taking the luminance of a screen at an X-ray dose of 7.2 mR (0.139 $mR^{-1}$) as a standard (100). Specifically, a commercially available screen UM Mammo Fine (produced by Kasei Optonics K.K.) was found to have an emission luminance of 0.139 $mR^{-1}$ as measured as described above. In other words, the emission luminance of UM Mammo Fine corresponds to the standard (100). Emission luminances of other several commercially available screens are shown in Example 2 hereinafter described.

In the measurement of emission luminance, commercially available photographing equipment for mammography can be used as an X-ray generator. In the present invention, DRX-B1356EC manufactured by Toshiba Corp. and an Mo filter of standard equipment were used. A 2 cm thick acrylic filter was placed about 20 cm apart from the bulb. The distance between the ray source and the screen was about 60 cm.

A commercially available ionization dosimeter for low-energy X-rays can be used. In the present invention, an ionization dosimeter mdh1015C Model and an ion chamber 10X5-6M, both manufactured by Radical Corp., were used. Corrections were made for the differences in position (the position of measurement and the actual position of a screen), temperature, atmospheric pressure, etc. and for the absorption by the cassette plate to obtain the X-ray dose actually given to the film-screen combination.

The screen used in the present invention preferably has an emission luminance of 150 to 250, still preferably 160 to 240, particularly preferably 170 to 240, especially preferably 170 to 220, as measured according to the above-described method.

As previously stated, the luminance of a screen is almost proportional to the X-ray utilization. In general, a screen for mammography has a thin fluorescence substance layer or a colored fluorescence substance layer so as to maintain high sharpness. In these cases, however, it follows that the X-ray absorption is reduced or that, if X-rays are sufficiently absorbed, luminescence taking place in the area farther from the surface of X-ray incidence cannot be utilized effectively. The reduction in X-ray utilization leads to an increase in noise (quantum noise) of a finally obtained image. That is, low X-ray utilization results in formation of an image with grain coarseness. The grain coarseness has been within an acceptable range in the conventional X-ray photographic image forming systems for mammography (combinations of an X-ray intensifying screen and a light-sensitive material). Therefore, weight having been put on sharpness, a screen capable of achieving high sharpness has been mainly used even though the X-ray utilization is low (i.e., even though the graininess is somewhat poor). However, in a system using a light-sensitive material exhibiting much higher contrast than ever as in the present invention, the intensity of signals is amplified, but in turn, the quantum noise is also amplified, which results in coarse graininess beyond the acceptable range practical for diagnosis. Hence, in order to accomplish the object of the invention, a high-luminance screen which achieves high X-ray utilization while minimizing deterioration in sharpness is preferably used. Combining the high-luminance screen and the high-contrast light-sensitive material is effective in preventing deterioration in graininess due to quantum noise and in providing an image having high signal intensity owing to high contrast which enables exact diagnosis. Further, as previously mentioned, use of the high-luminance screen allows the light-sensitive material to be combined therewith to have a low sensitivity as far as the sensitivity of the system (the combination of the light-sensitive material and the screen) can be secured. This makes it feasible to use a light-sensitive material exhibiting such a high contrast as has been extremely difficult to prepare. That the screen used in the present invention has an emission luminance of 150 or more is of great significance in view of the possibilities that high X-ray utilization is reached to provide an image of excellent graininess and that a high-contrast light-sensitive material can be applied to the system.

The concept "effective X-ray utilization" as referred to above is generally expressed in terms of DQE (detective quantum efficiency). The details of DQE are given in JP-A-6-75097. For effective X-ray utilization, it is desirable for the fluorescence substance layer of the screen not to be substantially colored. The language "not to be substantially colored" as used herein is intended to mean that the luminance of a screen is not less than 80% of that of a screen whose fluorescence substance layer is not at all colored with a colorant (dye or pigment).

The sharpness of the screen which is preferably used in the invention will be explained below. The inventors have ascertained that the sharpness required of such a mammographic system is 0.40 to 1.00, particularly 0.45 to 1.00, at a spatial frequency of 5 line pairs/mm.

The sharpness of a screen can be measured as follows. It can be measured by using a light-sensitive material for mammography which has a silver halide emulsion layer on only one side thereof. The light-sensitive material to be used has its back side coated with a water-soluble dye, etc. for antihalation, which is regarded as a matter of course in the art. In the present invention, a single-sided X-ray film UMMA-HC produced by Fuji Photo Film Co., Ltd. was used. UMMA-HC Film is brought into contact with an intensifying screen and put in a cassette for mammography (ECMA produced by Fuji Photo Film Co., Ltd.). A rectangular chart for MTF measurement (Type 9, produced by Kasei Optonics K.K.; made of Sn; thickness: 40 μm; spatial frequency: 0 to 10 line pairs/mm) is brought into intimate contact with the cassette and placed 60 cm apart from an X-ray bulb in the order of MTF chart, cassette plate, X-ray film, and intensifying screen. The same X-ray source as used in the measurement of screen luminance can be used. The nominal focal size of the X-ray bulb used was 0.4 mm. An acrylic filter is plated 20 cm apart from the focus of the bulb, at an ample distance of 40 cm from the X-ray chart and the screen, so as to minimize incorporation of scattered rays.

The exposed film is subjected to development processing (1). The density of the shadow is set at 1.8 by exposure time adjustment so that the substantial straight line portion of the resulting characteristic curve may be used. The chart after development is scanned with a microdensitometer having an aperture of 30 μm in the scanning direction and 500 μm in the direction perpendicular to the scanning direction. The density profile was measured over 20 sampling lengths each being 30 μm to obtain a mean density, which is taken as a profile from which CTF is to be calculated. Thereafter, the peak of square waves of the density profile is detected for every frequency, and the density contrast is calculated for each frequency. The density contrast is standardized with respect to the contrast at zero frequency to obtain a contrast transfer function (CTF).

As for other particulars of the screen that can be preferably used in the present invention and the related technology, reference can be made to in JP-A-6-75097 and JP-A-9-21899.

The photographic image forming system comprising a light-sensitive material and an intensifying screen also has its own preferred range of sensitivity (system sensitivity). A preferred photographic image forming system has a system sensitivity of 5.5 to 10 mR, particularly 6 to 9 mR, in terms of X-ray dose necessary to provide an optical density of (fog+1.0) after the system is exposed to X-rays emitted from an Mo target tube run at 26 kVp in a three-phase system and having passed through 1 mm of Be, 0.03 mm of Mo, and a 2 cm thick acrylic resin filter and then subjected to development processing (1). The higher the above-identified X-ray dose, the lower the system sensitivity, and vise versa. A low-sensitivity system having a system sensitivity of 10 mR or more is favorable in terms of quantum noise but is unfavorable for the human body because of an increased dose of radiation. According to the inventors' study, there is little merit for the final image in such a low system sensitivity as an X-ray dose of 10 mR or more. On the other hand, a high-sensitivity system of 5.5 mR or less is favorable for the human body, but the final image tends to suffer deteriorated graininess, sometimes inadequate for diagnosis.

The system of the invention produces its pronounced effect when the system sensitivity falls within the above-specified range. The particular combination of UM-Fine screen and UMMA-HC film as used above had a system sensitivity of 7.2 mR. While the system according to the invention is equal in sensitivity to the UM-Fine/UMMA-HC combination, the former is characterized in that the screen has a high luminance and the film has low sensitivity. In the photographic image forming system according to the present invention, the sensitivity of the light-sensitive material should be appropriately adjusted so that the system sensitivity may fall within the above-specified range.

The present invention will now be illustrated in greater detail with reference to Examples, but it should be understood that the invention is not construed as being limited thereto. Unless otherwise noted, all the percents are by weight.

EXAMPLE 1

Preparation of Light-Sensitive Material

Preparation of Film A:

(1) Preparation of Fine-Grain High-Contrast Emulsions a1 and c1

To 1 l of a 2% gelatin aqueous solution containing 5.3 g of potassium bromide and 4 g of sodium p-toluenesufinate were added 10 mg of sodium thiosulfate pentahydrate, 1.6 g of potassium thiocyanate, and 10 ml of glacial acetic acid. To the mixture were added while vigorously stirring 14 ml of an aqueous solution of 5.1 g of silver nitrate and 7 ml of an aqueous solution of 1.8 g of potassium bromide and 0.08 g of potassium iodide over a 30 second period according to a double jet process. Then, 30 ml of an aqueous solution of 3 g of potassium iodide was added thereto.

To the mixture were added 200 ml of an aqueous solution of 78.1 g of silver nitrate and 200 ml of an aqueous solution of 50.6 g of potassium bromide and 2.3 g of potassium iodide in this order each over a 15 minute period. Then 7.8 ml of 25% aqueous ammonia was added, followed by ripening for 10 minutes. To the reaction mixture were added simultaneously an aqueous solution containing 117 g of silver nitrate and an aqueous solution containing 82.3 g of potassium bromide over a period of 14 minutes. The reaction system was kept at 58° C. throughout the above reaction steps.

The resulting emulsion was washed by a flocculation method in a usual manner. Gelatin, a thickener, and an antiseptic were dispersed therein, and the pH and the pAg were adjusted to 5.6 and 8.9, respectively. To the emulsion, while kept at 57° C., were added 216 mg of 4-hydroxy-6-methyl-1,3,3a,7-tetraazaindene and then 270 mg of sensitizing dye A (green sensitizing dye), and 300 mg of sensitizing dye B (blue sensitizing dye), followed by ripening for 10 minutes. Then 8.7 mg of sodium thiosulfate pentahydrate, 54 mg of potassium thiocyanate, and 3.1 mg of chloroauric acid were added in this order, followed by ripening for 60 minutes. Finally, 690 mg of 4-hydroxy-6-methyl-1,3,3a,7-tetraazaindene and 5.1 ml of a 10% aqueous solution of potassium iodide were added, followed by cooling to obtain a mono-dispersed, fine and non-tabular grain emulsion having an average grain size of 0.45 μm (designated as emulsion a1).

Green Sensitizing Dye A:

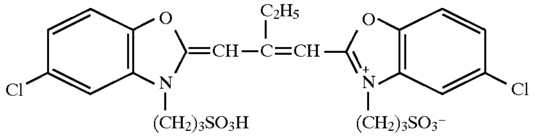

Blue Sensitizing Dye B:

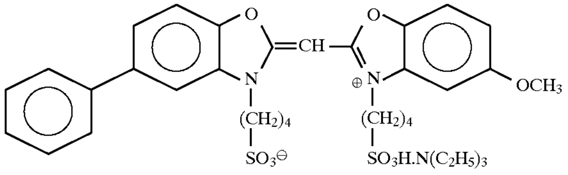

Emulsion c1 having an average grain size of 0.65 μm was obtained in the same manner as for emulsion a1, except that the reaction temperature during grain formation was raised to 70° C. and the amount of potassium thiocyanate was increased to 2.4 g thereby to increase the silver halide grain size and that sensitizing dye B was not used in chemical sensitization.

(2) Preparation of Coating Composition

Each of emulsions a1 and c1 and the following compounds were compounded to prepare two coating compositions for an emulsion layer. Coating compositions for a protective layer, an antihalation layer, and a backing layer were also prepared according to the following formulation.

Emulsion Layer Coating Composition:

| | |
|---|---|
| Emulsions a1 or c1 | 1 kg (gelatin: 81 g; Ag: 92 g) |
| Polymer latex (ethyl acrylate/methacrylic acid copolymer = 97/3 by weight) | 2.9 g |
| Hardening agent (1,2-bis(vinylsulfonyl-acetamido)ethane) | 1.1 g |
| 2,6-Bis(hydroxyamino)-4-diethylamino-1,3,5-triazine | 0.04 g |
| Dextran (average molecular weight: 39,000) | 10 g |
| Toe-gradation controlling agent | 0.34 g |
| 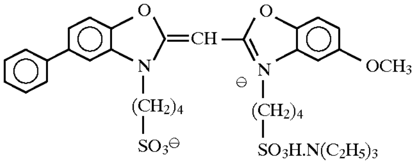 | |
| Potassium p-hydroquinonesulfonate | 5.4 g |
| Potassium iodide | 0.05 g |
| Distilled water | to make 1160 ml |

Protective Layer Coating Composition:

| | |
|---|---|
| Gelatin | 1 kg |
| $C_{16}H_{33}O(CH_2CH_2O)_{10}H$ | 27 g |
| $C_8F_{17}SO_2N(C_3H_7)\ (CH_2CH_2O)_4(CH_2)_4SO_3Na$ | 1.4 g |
| $C_8F_{17}SO_2N\ (C_3H_7)\ (CH_2CH_2O)_{15}H$ | 0.92 g |
| Polymethyl methacrylate particles (average particle size: 2.5 μm) | 69 g |
| Proxel | 0.7 g |
| Sodium polyacrylate (average molecular weight: 41,000) | 19 g |
| Sodium polystyrenesulfonate (average molecular weight: 600,000) | 10.5 g |

-continued

| | |
|---|---|
| NaOH | 3.2 g |
| $C_8H_{17}C_6H_4(OCH_2CH_2)_3SO_3Na$ | 16.2 g |
| Distilled water | to make 11.1 l |

Antihalation Layer Coating Composition:

| | |
|---|---|
| Gelatin | 1 kg |
| Polymer latex (ethyl acrylate/methacrylic acid copolymer = 97/3 by weight) | 130 g |
| Phosphoric acid | 1.23 g |
| Snowtex C | 120 g |
| Proxel | 0.4 g |
| Dye dispersion L* | 190 g |
| Dye-2 | 18 g |
| Dye-3 | 12.5 g |
| Dye-4 | 13 g |
| Hardening agent (1,2-bis(vinylsulfonyl-acetamido)ethane) | 17.5 g |
| Distilled water | to make 13.8 l |

*Dye dispersion L was prepared as follows. A solution of 2.5 g of dye-1, 2.5 g of oil-I, and 2.5 g of oil-II in 50 ml of ethyl acetate was mixed with 90 g of a 8% aqueous gelatin solution containing 0.18 g of methyl p-hydroxybenzoate at 60° C., and the mixture was stirred at a high speed in a homogenizer. The homogenate was evaporated at 60° C. under reduced pressure in an evaporator to remove 92% of ethyl acetate to give dye dispersion L having an average dispersed particle size of 0.18 μm Dye-1:

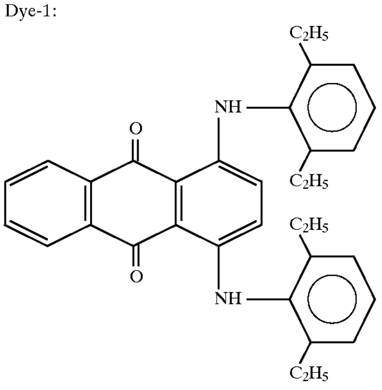

Dye-2:

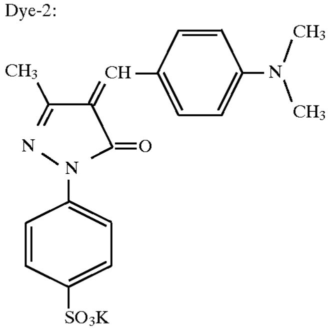

Dye-3:

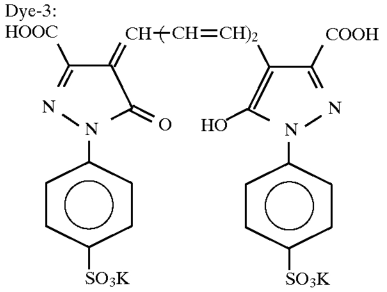

-continued

Dye-4:

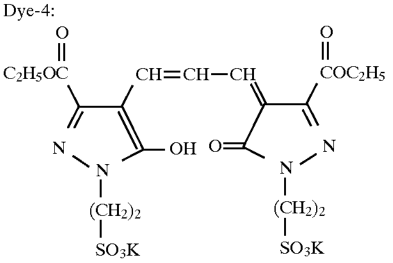

Oil-I:

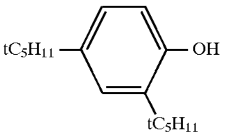

Oil-II:

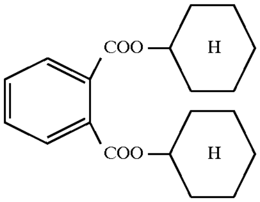

Backing Layer Coating Composition:

| | |
|---|---|
| Gelatin | 1 kg |
| $C_{16}H_{33}O(CH_2CH_2O)_{10}H$ | 33 g |
| $C_8F_{17}SO_2N(C_3H_7)$ $(CH_2CH_2O)_4(CH_2)_4SO_3Na$ | 1.4 g |
| $C_8F_{17}SO_2N$ $(C_3H_7)$ $(CH_2CH_2O)_{15}H$ | 0.92 g |
| Polymethyl methacrylate particles (average particle size: 3.7 μm) | 34 g |
| Proxel | 0.7 g |
| Sodium polyacrylate (average molecular weight: 41,000) | 75 g |
| Sodium polystyrenesulfonate (average molecular weight: 600,000) | 1O.5 g |
| NaOH | 2.3 g |
| $C_8H_{17}C_6H_4(OCH_2CH_2)_3SO_3Na$ | 20 g |
| Distilled water | to make 10.7 l |

(3) Preparation of Light-Sensitive Material

The coating compositions for an emulsion layer and a protective layer were applied by co-extrusion onto one side of a 175 μm thick PET film having a subbing layer to form a protective layer, an emulsion a1 layer (upper emulsion layer), and an emulsion c1 layer (lower emulsion layer) from the top to the bottom. The protective layer had a gelatin content of 0.6 g/m$^2$. The silver coating weight of the upper and lower emulsion layers are shown in Table 2 below. The coated film was dried to obtain a light-sensitive material (designated film A). On the reverse side of the support were provided an antihalation layer and a protective backing layer having a gelatin content of 3.9 g/m$^2$ and 1.27 g/m$^2$, respectively.

Preparation of Films B to H:

Films B to H were prepared in the same manner as for film A, except for altering the method for preparing emulsions or the amounts of the compounds used in the coating compositions for the emulsion layers as shown in Tables 1 and 2 below. Emulsions used in films B to H were prepared in the same manner as for emulsions a1, except for changing the reaction temperature and the amount of potassium thiocyanate thereby to change the grain size, optimizing the chemical sensitization so as to give the emulsion sensitivity in agreement with the grain size, and adjusting the amount of sensitizing dyes A and B thereby to alter the absorption characteristics of the emulsion.

TABLE 1

| Emulsion No. | Average Grain Size (μm) | Sensitizing Dye A (mg) | Sensitizing Dye B (mg) |
|---|---|---|---|
| a1 | 0.45 | 270 | 300 |
| a2 | 0.45 | 600 | 0 |
| b1 | 0.55 | 270 | 200 |
| c1 | 0.65 | 270 | 0 |
| c2 | 0.65 | 200 | 150 |
| d1 | 0.81 | 230 | 0 |

Measurement of Sensitivity and Contrast:

The sensitivity of films A to H was determined by exposing to X-rays the film combined with a commercially available intensifying screen UM-Fine while varying the X-ray exposure by a distance method. Since all the measurements were made using the same screen, the results obtained are regarded equal to those obtained by using an Mo target tube for actual mammography. More specifically, the sample film and UM-Fine screen were intimately contacted, put in a cassette (ECMA Cassette produced by Fuji Photo Film Co., Ltd.), set in front of a tungsten target X-ray tube run at 50 kVp in a three-phase system in the order of the cassette plate, the film, and the screen, and exposed to X-rays emitted from the tube and having passed through a 3 mm thick aluminum plate. The exposure was varied stepwise by logE=0.15 by a distance method.

The exposed film was developed on an automatic processor (FPM-5000, manufactured by Fuji Photo Film Co., Ltd.) with developing solution G at 35° C. for 25 seconds (total processing time: 90 sec.). The density was measured, and the inverse of the exposure necessary to provide a density of (fog+1.0) was taken as a film sensitivity. The resulting sensitivity was relatively expressed taking the sensitivity of UMMA-HC as a standard (100). UMMA-HC develops a density of (fog+1.0) when exposed to monochromatic light having a wavelength of 545 nm±20 nm at an exposure of 0.0210 lux.sec.

The contrast of the sample film was obtained as a slope of the straight line connecting the point of (fog+0.25) and the point of (fog+2.0) in a characteristic curve in accordance with the definition hereinabove described. The results obtained are shown in Table 2.

TABLE 2

| | | | Emulsion (Ag Content; g/m$^2$) | | Sensitivity | Toe Gradation Controlling Agent |
|---|---|---|---|---|---|---|
| Film No. | Relative Sensitivity | Average Contrast | Upper Layer (U) | Lower Layer (L) | Difference (U − L) (logE) | (g) |
| UMMA-HC | 100 | 3.6 | — | — | — | — |
| A* | 50 | 4.3 | a1 (1.9) | c1 (1.9) | −0.25 | added (0.34) |
| B* | 52 | 3.9 | a1 (1.9) | c1 (1.9) | −0.25 (0.17) | added |
| C* | 54 | 3.6 | al (1.9) | cl (1.9) | −0.25 | not added |
| D | 48 | 3 | a2 (1.9) | c1 (1.9) | −0.20 | added (0.34) |
| E | 50 | 3.2 | b1 (3.8) | — | 0 | added (0.34) |

TABLE 2-continued

| Film No. | Relative Sensi-tivity | Average Con-trast | Emulsion (Ag Content; g/m²) Upper Layer (U) | Lower Layer (L) | Sensi-tivity Difference (U − L) (logE) | Toe Grada-tion Control-ling Agent (g) |
|---|---|---|---|---|---|---|
| F | 100 | 3.8 | c2 (1.9) | d1 (2.1) | −0.20 | added (0.34) |
| G | 105 | 3.3 | c1 (1.9) | d1 (2.1) | −0.15 | added (0.34) |
| H | 72 | 2.4 | c1 (1.9) | a1 (1.9) | +0.25 | added (0.34) |

Note:
*Films according to the present invention.

The sensitivity of the sample film to monochromatic light of 545 nm as defined above was obtained. The results are shown in Table 3 below.

TABLE 3

| Sample No. | Sensitivity (lux.sec; at 545 nm) |
|---|---|
| UMMA-HC | 0.0210 |
| A* | 0.0480 |
| B* | 0.0463 |
| C | 0.0450 |
| D | 0.0485 |
| E | 0.0480 |
| F | 0.0210 |
| G | 0.0205 |
| H | 0.0320 |

From Tables 2 and 3 are drawn the following observations.

1. Comparison between films A and E reveals that a double-layered structure having a finer-grain and lower-sensitivity emulsion as an upper layer exhibits improved contrast over a single-layered structure having the same sensitivity throughout the emulsion layer. Film H having a higher-sensitivity emulsion as an upper layer exhibits extremely low contrast.

2. It was confirmed that a combined use of a blue sensitizing dye (dye A) and a green sensitizing dye (dye B) as in emulsions a1 and c2 reduces green light absorption through separate experimentation on samples coated with each one of the emulsions. Reduction in green light absorption is effective in preventing reduction in contrast (softening) due to a shielding effect. Thus, films A and F exhibit improved contrast over films D and G, respectively.

3. Comparison among films A, B, and C reveals that addition of a toe-gradation controlling agent represented by formula (I) brings about an improvement in contrast.

4. Whatever effort was made, films having a sensitivity of 90 or higher failed to attain a contrast of 3.8 or higher.

5. The results of measurement of absolute sensitivity prove that films A, B. and C satisfy the sensitivity requirement as specified in the present invention.

EXAMPLE 2

Preparation of Intensifying Screen (1) Preparation of Carbon Black Subbing Layer Methyl ethyl ketone, 40 g of carbon black powder, and 80 g of binder C (Cryscoat P1018GS, produced by Dainippon Ink & Chemicals, Inc.) were mixed and dispersed to prepare a coating composition having a viscosity of 3 ps. The coating composition was uniformly applied to a 350 μm thick transparent PET film with a doctor blade and dried to form a subbing layer having a thickness of 20 μm. The subbing layer was sufficiently light-shielding and very smooth.

(2) Preparation of Support with $TiO_2$ Light-Reflecting Layer

Methyl ethyl ketone, 500 g of rutile type $TiO_2$ powder having an average particle size of 0.28 μm (CR95, produced by Ishihara Sangyo Kaisha, Ltd.), and 100 g of binder C (Cryscoat P1018GS) were mixed and dispersed to prepare a coating composition having a viscosity of 10 ps and a binder to $TiO_2$ weight ratio of 1:5. The coating composition was uniformly applied to a 350 μm thick transparent PET film with a doctor blade and dried to form a light-reflecting layer having a thickness of 35 μm. The light-reflecting layer had a highly smooth surface with no agglomeration of the $TiO_2$ particles. The layer had a diffuse reflectance of 94% as measured at 545 nm, a dominant emission peak of the fluorescence substance used here ($Gd_2O_2S$;Tb), proving to be a reflecting layer having a sufficiently high reflectance and a reflection sharpness.

(3) Preparation of Fluorescence Substance Layer

A fluorescence substance $Gd_2O_2S$:Tb (250 g) having an average particle size of 2 μm (average sphere-equivalent diameter as measured under an electron microscope), 6 g (on a solid basis) of binder A (Desmolac TPKL-5-2625, polyurethane produced by Sumitomo Bayer Urethane Co., Ltd.), 1 g of binder B (Epikoat 1001, produced by Yuka Shell Epoxy Co., Ltd.), and 0.5 g of an isocyanate compound (Colonate HX, produced by Nippon Polyurethane Industry Co., Ltd.) were dispersed in methyl ethyl ketone in a propeller mixer to prepare a coating composition having a viscosity of 20 ps (at 25° C.). The coating composition was applied to a PET film having thereon a silicone parting agent as a temporary support, dried, and stripped off the temporary support to obtain a fluorescence substance layer having a thickness of 125 μm.

(4) Preparation of Fluorescence Substance Screen

The fluorescence substance layer obtained in (3) above was put on the support having a subbing layer obtained in (1) above and pressed by means of a calender roll at 400 kgw/cm² and 80° C. to prepare a fluorescence substance sheet with no protective layer. After calendering, the fluorescence substance layer had a thickness of 105 μm, and the packing density of the fluorescence substance was 68% by volume.

(5) Preparation of Surface Protective Layer

In a mixed solvent of methyl ethyl ketone and cyclohexanone (1:1 by weight) were dissolved 10 g of a fluorine-containing resin (Sefralcoat, produced by Central Glass Co., Ltd.), 1.5 g of an alcohol-modified siloxane oligomer (X-22-2809, produced by Shin-Etsu Chemical Co., Ltd.), 3.2 g of an isocyanate compound (Olester NP38-70S, produced by Mitsui Toatsu Chemicals, Inc.), and 0.001 g of a catalyst (KS1269, produced by Kyodo Yakuhin K.K.) to prepare a coating composition for a protective layer. The coating composition was applied to the fluorescence substance sheet with a doctor blade, slowly dried, and heat-treated at 120° C. for 10 minutes to obtain a fluorescence substance sheet having a 4 μm thick protective layer.

(6) Embossing

The fluorescence substance sheet was embossed with a stainless steel-made roll having random embossing at a linear pressure of 40 kg/cm, a speed of 3 m/min, and a temperature of 50° C.

(7) Stamping

A PET masking film having holes slightly larger than the desired stamp was intimately contacted with the surface of the protected fluorescence substance layer where to be stamped, and a discharge treatment was carried out using a pinhole tester (Teslercoil K type, manufactured by Tokyo Kosyuha Denkiro K.K.) at 25° C., 65% RH, at a distance of 1 cm for 3 seconds. Thereafter, the fluorescence substance layer was stamped with an ink ribbon (BLACK-TP, produced by Nakajima Kinzoku Hakufun Kogyo K.K.) by means of a hot press at 100° C. and 5 kg/$cm^2$ for 10 seconds.

There was thus prepared screen 2 having a 105 μm thick fluorescence substance layer and a 4 μm thick protective layer as shown in Table 4 below. Screens 1, 3, and 4 were prepared in the same manner as for screen 2, except for varying the thickness of the fluorescence layer thickness. Further, screens 5 to 9 were prepared in the same manner except for replacing the carbon black subbing layer with the above-described titanium oxide reflecting layer.

For the purpose of observing the influence of carbon black powder added to the fluorescence substance layer as an emitted light absorbing agent, screens 10 and 11 were prepared in the same manner as for screen 2, except for adding carbon black fine powder to the fluorescence substance layer in an amount of 0.0015% or 0.006% based on the weight of the fluorescence substance.

(8) Measurement of Emission Luminance of Screen

A single-sided silver halide photographic material which produces an optical density of (fog+1.0) when exposed to monochromatic light having a wavelength of 545 nm±20 nm at an illuminance of 0.0210 lux for 1 second and developed according to development processing (1) was used. In Example 2, UMMA-HC #919-01 (X-ray film for mammography, produced by Fuji Photo Film Co., Ltd.) was used.

The emulsion side of UMMA-HC film and the protective layer of the screen were brought into intimate contact and put in ECMA cassette produced by Fuji Photo Film Co., Ltd. The cassette was set in front of an X-ray tube in the order of the cassette plate, the film, and the screen. The cassette was exposed to X-rays using exposure equipment for mammography DRX-B1356EC manufactured by Toshiba Corp. X-Rays emitted from an Mo target tube run at 26 kVp in a three-phase system and having passed through 1 mm thick Be, 0.03 mm thick Mo, and a 2 cm thick acrylic resin filter was used. The distance between the ray source and the screen was about 60 cm. Simultaneously with X-ray exposure, the X-ray dose was measured with a commercially available ionization dosimeter mdh1015C Model and an ion chamber 10X5-6M, both manufactured by Radical Corp. Corrections were made for the position (the position of measurement and the actual position of a screen), temperature, atmospheric pressure, etc. and for the absorption by the cassette plate to obtain the X-ray dose actually given to the film/screen combination.

The irradiation dose was varied by varying the current applied to the X-ray tube and the exposure time from 0.5 to 1.5 seconds, and the dose that provides a density of (fog+1.0) was obtained.

The exposed film was subjected to development processing (1) on an automatic processor FPM-5000, manufactured by Fuji Photo Film Co., Ltd. The optical density of the film was measured and plotted against the X-ray dose to obtain the dose providing a density of (fog+1.0). The inverse of the dose necessary for providing a density of (fog+1.0) was taken as a measure of the emission luminance of the screen. As previously described, when the measurement was made using a commercially available screen UM-Fine Screen produced by Kasei Optonics K.K., an X-ray dose of 7.2 mR resulted in a film density of (fog+1.0). The emission luminance of UM-Fine Screen is 0.139 $mR^{-1}$. The luminance of screens 1 to 11 was expressed relatively taking the emission luminance of UM-Fine Screen as a standard (100). The relative emission luminance of screens 1 to 11 and commercially available screens thus obtained are shown in Table 4.

(9) Measurement of CTF

A single-sided film UMMA-HC produced by Fuji Photo Film Co., Ltd. was contacted with each screen, and a rectangular chart for MTF measurement (Type 9, produced by Kasei Optonics K.K.; made of Sn; thickness: 40 μm; spatial frequency: 0 to 10 line pairs/mm) was photographed. The conditions for exposure and the system arrangement were the same as in the measurement of emission luminance. The current of the X-ray tube was 100 mA so that the X-ray tube had a focal size of 0.4 mm (nominal size). The chart was placed about 60 cm apart from the X-ray tube and in intimate contact with the cassette. The acrylic resin filter for adjustment of the ray character was plated 20 cm apart from the focus of the tube, at an ample distance of 40 cm from the X-ray chart and the screen, so as to minimize incorporation of scattered rays.

The density of the shadow was set at 1.8 by adjusting the exposure time. After development processing (1), CTF was obtained in accordance with the above-described method. The CTF as measured at a spacial frequency of 5 line pairs/mm is shown in Table 4.

TABLE 4

| Screen No. | Subbing Layer | Fluorescence Substance Layer: Thickness (μm) | Carbon Black (wt %*) | Fluorescence Substance ($mg/cm^2$) | Emission Luminance | CTF (5 line pairs/mm) |
|---|---|---|---|---|---|---|
| 1 | CB** | 130 | 0 | 62 | 210 | 0.38 |
| 2 | CB** | 105 | 0 | 52 | 200 | 0.46 |
| 3 | CB** | 80 | 0 | 40 | 175 | 0.56 |
| 4 | CB** | 60 | 0 | 28 | 140 | 0.61 |
| 5 | $TiO_2$ | 130 | 0 | 65 | 240 | 0.36 |
| 6 | $TiO_2$ | 85 | 0 | 45 | 200 | 0.42 |
| 7 | $TiO_2$ | 65 | 0 | 30 | 190 | 0.48 |
| 8 | $TiO_2$ | 50 | 0 | 26 | 165 | 0.59 |
| 9 | $TiO_2$ | 30 | 0 | 15 | 125 | 0.64 |
| 10 | CB | 100 | 0.0015 | 50 | 140 | 0.57 |
| 11 | CB | 100 | 0.006 | 50 | 110 | 0.66 |
| S-1 | UM-Fine, produced by Kasei | | | | 100 | 0.57 |

TABLE 4-continued

| Screen No. | Subbing Layer | Fluorescence Substance Layer Thickness (μm) | Carbon Black (wt %*) | Fluorescence Substance (mg/cm$^2$) | Emission Luminance | CTF (5 line pairs/mm) |
|---|---|---|---|---|---|---|
| | Optonics K.K. | | | | | |
| S-2 | UM-Medium, produced by Kasei Optonics K.K. | | | | 135 | 0.46 |
| | Min-R, produced by Eastman Kodak Co. | | | | 95 | 0.52 |
| S-4 | Min-R-medium, produced by Eastman Kodak Co. | | | | 140 | 0.41 |
| S-5 | M-2001 produced by Konica Corp. | | | | 170 | 0.36 |
| S-6 | Min-R-Fast front, produced by Eastman Kodak Co. | | | | 70 | 0.56 |
| S-7 | Min-R-Fast back, produced by Eastman Kodak K. | | | | 135 | 0.39 |

Note:
*: Based on the weight of the fluorescence substance.
**: Carbon black

Screens S-1 to S-7 all use $Gd_2O_2S$:Tb.

As is apparent from Table 4, the screens experimentally prepared according to the present invention are superior to commercially available ones in both emission luminance and CTF. Of these screens those having an emission luminance of 150 or more and a CTF (5 line pairs/mm) of 0.40 or more are particularly suitable for mammography when combined with the light-sensitive material according to the present invention, which will be demonstrated in the following Examples.

Commercially available screens developed for use at a high tube voltage of 40 kVp or higher, while not for mammography and not immediately relevant to the present invention, were subjected to the same experiments as described above. The results obtained are shown in Table 4-1 for reference (comparative examples). It is seen that they do not satisfy the preferred embodiments of the present invention even if applied to mammography.

TABLE 4-1

| Commercially Available Screen | Emission Luminance | CTF (5 line pairs/mm) |
|---|---|---|
| HR-3, produced by Kasei Optonics K.K. | 110 | 0.49 |
| HR-4, produced by Kasei Optonics K.K. | 160 | 0.35 |
| HGM, produced by Fuji Photo Film Co., Ltd. | 263 | 0.37 |
| XGS front, produced by Konica Corp. | 225 | 0.30 |

EXAMPLE 3

Evaluation of Photographic Image Forming System

A phantom RMI-156 produced by Gammex Co. (serial No. 156-12438) was X-rayed using a combination of the film prepared in Example 1 and the screen prepared in Example 2 to evaluate the detecting ability. The results obtained are shown in Table 5 below. The photographing voltage was 28 kVp, and a grid was used. The X-ray picture was evaluated in terms of (1) macro-detection ability (an ability of detecting big mass calcification fibers) and (2) micro-detection ability (an ability of detecting small mass calcification fibers) and graded as follows.

A Clearly seen

B Sufficiently detectable

C Slightly seen

D Not seen

TABLE 5

| System | Screen | Film | Average Contrast | System Sensitivity | Macro-detection Ability | Micro-detection Ability |
|---|---|---|---|---|---|---|
| 1 | 2 | A | 4.3 | 100 (7.2 mR) | A | B |
| 2 | 2 | B | 3.9 | 105 (6.9 mR) | A | A |
| 3 | 2 | C | 3.6 | 110 (6.5 mR) | B | B |
| 4 | 2 | E | 3.2 | 100 | C | C |

TABLE 5-continued

| System | Screen | Film | Average Contrast | System Sensitivity | Macro-detection Ability | Micro-detection Ability |
|---|---|---|---|---|---|---|
| | | | | (7.2 mR) | | |
| 5 | 2 | F | 3.8 | 200 (3.6 mR) | B | D |
| 6 | 2 | UMMA-HC | 3.6 | 200 (3.6 mR) | C | D |
| 7 | 2 | G | 3.3 | 210 (3.4 mR) | C | D |
| 8 | UM-Fine | F | 3.8 | 100 (3.6 mR) | B | D |
| 9 | UM-Fine | UMMA-HC | 3.6 | 100 (7.2 mR) | C | C |
| 10 | UM-Fine | G | 3.3 | 105 (6.9 mR) | C | C |
| 11 | UM-Fine | B | 3.9 | 52 (13.8 mR) | A | A |

It is understood from comparison among systems 1 to 4 that improvement in macro-detecting ability is achieved by increasing the contrast most of all. However, a system which achieves a contrast of 3.6 or higher by using a conventional screen such as UM-Fine results in grain coarseness due to amplified noise, failing to provide an X-ray image from which fine mass calcification fibers are sufficiently detectable (see system 8). To the contrary, grain coarseness can be controlled and the contrast can be increased to provide an image of high detection ability by combining a screen that sufficiently utilizes X-rays and has a high emission luminance to provide satisfactory graininess as used in the present invention and a film in such a manner that the combination may have a sensitivity of from 5.5 to 10 mR.

As shown in Table 2, films having a relative sensitivity of 90 or higher cannot have its contrast increased over 3.8. Because a film having half the sensitivity would suffice if combined with the screen having a high luminance according to the present invention, it is easy to design a high-contrast film that has been technically difficult to prepare. The advantage of the high-luminance screens of the present invention also consists in this ease of preparing a high-contrast film. When the high-luminance screen of the invention is combined with a film having an unadjusted sensitivity, the system has an increased sensitivity, which results in extremely poor graininess, failing to depict micro-signals (see systems 5, 6 and 7).

System 11 (a combination of UM-Fine and film B) exhibits high detection ability, but its sensitivity is half that of conventional systems. This means that a patient is to receive an increased dose of radiation, which is unfavorable as a screen for mammography. As compared with system 11, system 2 of the present invention exhibits equal detection ability and yet requires half the dose.

EXAMPLE 4

Evaluation of Photographic Combination

Screens were prepared in the same manner as for screen 2 of Example 2, except that a surface protective layer was provided by laminating a PET film having a varied thickness as shown in Table 6 below.

TABLE 6

| Screen No. | Reflective Layer | Thickness of Fluorescence Substance Layer (μm) | Thickness of Protective Layer (μm) | Emission Luminance | CTF (5 line pairs/mm) |
|---|---|---|---|---|---|
| 2 | CB* | 105 | 4 | 200 | 0.46 |
| 12 | CB | 105 | 6 | 200 | 0.42 |
| 13 | CB | 105 | 12 | 200 | 0.35 |

*Carbon black

Photographic image forming systems shown in Table 7 below were prepared and evaluated in the same manner as in Example 3 (RMI phantom). The results obtained are shown in Table 7.

TABLE 7

| System | Screen | Film | Average Contrast | CTF (5 line pairs/mm) | System Sensitivity | Macro-detection Ability | Micro-detection Ability |
|---|---|---|---|---|---|---|---|
| 2 | 2 | B | 3.9 | 0.46 | 105 (6.9 mR) | A | A |
| 12 | 12 | B | 3.9 | 0.42 | 105 (6.9 mR) | A | B |
| 13 | 13 | B | 3.9 | 0.35 | 105 (6.9 mR) | B | D |
| 9 | UM-Fine | UMMA-HC | 3.6 | 0.57 | 100 (7.2 mR) | C | C |

As is apparent from Table 7, while the system according to the present invention needs an intensifying screen having high sensitivity, high X-ray utilization, and satisfactory graininess, it is necessary for that screen to maintain a CTF level of 0.40 or higher at a spatial frequency of 5 line pairs/mm. It is seen that the detection ability is reduced at lower levels. The improvement obtained at higher levels is not so remarkable.

EXAMPLE 5

Evaluation of Photographic Image Forming System

Films shown in Table 8 below were prepared in the same manner as in Example 1, except that the relative sensitivity was adjusted at 75 by varying the amount of the sensitizing dyes, etc.

TABLE 8

| Film No. | Relative Sensitivity | Average Contrast | Sensitivity at 545 nm (lux · sec) |
|---|---|---|---|
| I | 75 | 3.9 | 0.0280 |
| J | 75 | 3.4 | 0.0280 |
| UMMA-HC | 100 | 3.6 | 0.0210 |

Photographic image forming systems shown in Table 9 below were prepared and evaluated in the same manner as in Example 3 (RMI phantom). The results obtained are shown in Table 9.

TABLE 9

| System | Screen | Screen Luminance | Film | Average Contrast | System Sensitivity | Macro-detecting Ability | Micro-detecting Ability |
|---|---|---|---|---|---|---|---|
| 2 | 2 | 200 | B | 3.9 | 105 (6.9 mR) | A | A |
| 14 | 4 | 140 | I | 3.9 | 105 (6.9 mR) | B | C |
| 15 | 4 | 140 | J | 3.4 | 105 (6.9 mR) | C | D |
| 16 | 10 | 140 | I | 3.9 | 105 (6.9 mR) | B | C |
| 9 | UM-Fine | 100 | UMMA-HC | 3.6 | 100 (7.2 mR) | C | C |

As is apparent from Table 9, the systems in which the fluorescence substance layer has a reduced thickness (screen 4) or the fluorescence substance layer is colored by addition of carbon black (screen 10) so as to increase the CTF suffer from deterioration of graininess, and the resulting images have poor micro-detection ability. Generally speaking, resolving power for fine objects depends on the CTF. Since a CTF of 0.40 or higher is sufficient for resolution, to increase the CTF more than necessary in order to improve resolution would make little contribution to improvement in detection ability. Therefore, in order to equalize the system sensitivity with a high screen luminance, it is preferably for the film to have a sensitivity lower than 0.03 lux.sec.

The present invention is to prove it important for the intensifying screen for mammography to utilize X-rays effectively and to keep the CTF at or above a certain level. This effect is particularly outstanding when the screen is combined with a high-contrast light-sensitive material.

EXAMPLE 6

Evaluation of Photographic Image Forming System

Photographic image forming systems having a system sensitivity of around 5 mR (140) were prepared and evaluated in the same manner as in Example 3. The results obtained are shown in Table 10 below.

TABLE 10

| System | Screen | Screen Luminance | Film | Average Contrast | System Sensitivity | Macro-detecting Ability | Micro-detecting Ability |
|---|---|---|---|---|---|---|---|
| 17 | 4 | 140 | F | 3.8 | 140 (5.1 mR) | B | D |
| 18 | 2 | 200 | I | 3.9 | 150 (4.8 mR) | B | C |
| 19 | UM-Medium | 135 | UMMA-HC | 3.6 | 135 (5.3 mR) | C | D |

Having a high system sensitivity around 140, the light-sensitive material/screen combination of the present invention is still preferred but with only slight superiority to the conventional high-sensitivity system. It can be seen from comparison with Example 3 that a system is preferably constructed by using a film having a sufficiently low sensitivity so as to have such a system sensitivity as provides an optical density of (fog+1.0) at an irradiation dose of 5.5 to 10 mR. Low-sensitivity systems requiring an X-ray dose higher than 10 mR have little merit for an increase in exposed dose.

While not going into details here, such a high-sensitivity system aims at reduction in dose of radiation, and it is preferable that the aim be accomplished by changing the X-ray source to X-rays of high energy but not by increasing the system sensitivity so that the X-ray absorption of the breast (absorbed dose of radiation) may be decreased. This approach has been accepted unfavorable because of involvement of reduction in contrast (signal intensity). In the present invention, the dose of radiation can be reduced while compensating for the reduction in signal intensity by using the high-contrast system. X-Rays of high energy can be obtained by increasing the tube voltage, replacing an Mo filter with an Rh or Al filter, or replacing the Mo target with an Rh target.

While the present invention has been demonstrated by way of measurements using an Mo target tube run at 26 kVp as an X-ray source, the system of the present invention comprising a high-luminance screen and a high-contrast film will enjoy a technical extension in various directions through alterations to the X-ray source.

EXAMPLE 7

Comparison of DQE

Example 7 is to demonstrate certain superiority of the system that is preferably used in the present invention in terms of quantitative physical characteristics as well. In Example 7, detection quantum efficiency (DQE) was used as a quantitative physical characteristic. A higher DQE value is interpreted to mean more effective X-ray utilization. The details of the method of obtaining a DQE value are given in JP-A-6-75097, page 26, left column, line 41 to page 27, right column, line 13. While DQE is essentially expressed absolutely, it is expressed relatively here taking DQE of the combination of UM-Fine (screen) and UMMA-HC (film) as 100. The results obtained are shown in Table 11 below.

TABLE 11

| System | Screen | Screen Luminance | Film | DQE (1 line pairs /mm) | CTF (5 line pairs /mm) | Remark |
|---|---|---|---|---|---|---|
| 2 | 2 | 200 | B | 150 | 0.46 | Invention |
| 3 | 3 | 175 | B | 140 | 0.56 | Invention |
| 20 | 11 | 110 | UMMA-HC | 105 | 0.66 | Comparison |
| 9 | UM-Fine | 100 | UMMA-HC | 100 | 0.57 | Comparison |
| 19 | UM-Medium | 135 | UMMA-HC | 120 | 0.46 | Comparison |

The photographic image forming system according to the present invention can be said to comprise an intensifying screen having a high DQE value and at least a certain level of CTF and a high-contrast film. The luminance of a screen is correlated to DQE. Screen 11 or UM-Fine in which the fluorescence substance layer is colored to increase the CTF cannot achieve sufficient X-ray utilization.

While the invention has been described in detail and with reference to specific examples thereof, it will be apparent to one skilled in the art that various changes and modifications can be made therein without departing from the spirit and scope thereof.

What is claimed is:

1. A silver halide photographic material for photographing soft tissues using low-energy X-rays generated at a tube voltage of not more than 40 kV, which comprises a support having on one side thereof at least two light-sensitive emulsion layers, said at least two light-sensitive emulsion layers each having silver halide emulsions different in sensitivity, wherein the uppermost light-sensitive emulsion layer is less sensitive than the lower light-sensitive emulsion layer, wherein the total silver coat amount of all of said at least two light-sensitive emulsion layers is from 2.0 to 5.5 g/$m^2$, and said silver halide photographic material exhibits an average contrast of from 3.6 to 4.8 and a sensitivity of from 0.03 to 0.07 lux.sec. when developed with a developer (G) having the following formulation at 35° C. for 25 seconds, Formulation of Developer (G):

| | |
|---|---|
| Potassium hydroxide | 21 g |
| Potassium sulfite | 63 g |
| Boric acid | 10 g |
| Hydroquinone | 25 g |
| Triethylene glycol | 20 g |
| 5-Nitroindazole | 0.2 g |
| Glacial acetic acid | 10 g |
| 1-Phenyl-3-pyrazolidone | 1.2 g |
| 5-Methylbenzotriazole | 0.05 g |
| Glutaraldehyde | 5 g |
| Potassium bromide | 4 g |
| Water to make | 1 l |
| pH adjusted to | 10.2. |

2. A silver halide photographic material according to claim 1, wherein said average contrast is from 3.8 to 4.5.

3. A silver halide photographic material according to claim 1, wherein the uppermost light-sensitive emulsion layer contains both a green sensitizing dye and a blue sensitizing dye.

4. A silver halide photographic material according to claim 1, which contains a compound represented by formula (I):

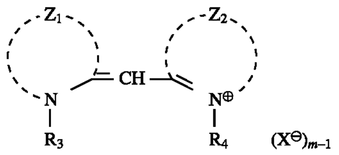

(I)

wherein $Z^1$ and $Z^2$ each represents an atomic group necessary to complete a thiazole ring, a thiazoline ring, an oxazole ring, a selenazole ring, a 3,3-dialkylindolenine ring, an imidazole ring or a pyridine ring; $R^3$ and $R^4$ each represents an alkyl group; $X^-$ represents an anion; and m represents 1 or 2; when m is 1, the compound forms an inner salt.

5. An X-ray photographic image forming system system for photographing soft tissues using low-energy X-rays generated at a tube voltage of not more than 40 kV, which comprises:

(A) a silver halide photographic material comprising a support having on one side thereof at least two light-sensitive emulsion layers, said at least two light-sensitive emulsion layers each having silver halide emulsions different in sensitivity, wherein the upper most light-sensitive emulsion layer is less sensitive than the lower light-sensitive emulsion layer; and (B) an intensifying screen having a fluorescence layer substantially comprising a $Gd_2O_2S$:Tb fluorescence substance, wherein the total silver coat amount of all of said at least two light-sensitive emulsion layers is from 2.0 to 5.5 $g/m^2$, and said silver halide photographic material exhibits an average contrast of from 3.6 to 4.8 and a sensitivity of from 0.03 to 0.07 lux.sec. when developed with a developer (G) having the following formulation at 35° C. for 25 seconds, Formulation of Developer (G):

| | |
|---|---|
| Potassium hydroxide | 21 g |
| Potassium sulfite | 63 g |
| Boric acid | 10 g |
| Hydroquinone | 25 g |
| Triethylene glycol | 20 g |
| 5-Nitroindazole | 0.2 g |
| Glacial acetic acid | 10 g |
| 1-Phenyl-3-pyrazolidone | 1.2 g |
| 5-Methylbenzotriazole | 0.05 g |
| Glutaraldehyde | 5 g |
| Potassium bromide | 4 g |
| Water to make | 1 l |
| pH adjusted to | 10.2, |

wherein said X-ray photographic image forming system has a system sensitivity of from 5.5 to 10 mR.

6. An X-ray photographic image forming system according to claim 5, wherein the fluorescence layer is not substantially colored and has a fluorescence substance content of 25 to 100 $mg/cm^2$.

7. An X-ray photographic image forming system according to claim 5, wherein said intensifying screen has a contrast transfer function (CTF) of from 0.40 to 1.00 at a spatial frequency of 5 line pairs/mm.

8. An X-ray photographic image forming system for mammography using low-energy X-rays generated at a tube voltage of not more than 40 kV, which comprises:

(A) a silver halide photographic material comprising a support having only on one side thereof a light-sensitive layer; and (B) an intensifying screen having a fluorescence layer substantially comprising a $Gd_2O_2S$:Tb fluorescence substance, wherein said screen has an emission luminance of 150 to 250 and a contrast transfer function (CTF) of from 0.40 to 1.00 at a spatial frequency of 5 line pairs/mm, and said silver halide photographic material has an average contrast of 3.6 to 4.8 when developed with a developer (G) having the following formulation at 35° C. for 25 seconds (development processing (1)), and said X-ray photographic image forming system has a system sensitivity of 5.5 to 10 mR when subjected to development processing (1), Formulation of Developer (G):

| | |
|---|---|
| Potassium hydroxide | 21 g |
| Potassium sulfite | 63 g |
| Boric acid | 10 g |
| Hydroquinone | 25 g |
| Triethylene glycol | 20 g |
| 5-Nitroindazole | 0.2 g |
| Glacial acetic acid | 10 g |
| 1-Phenyl-3-pyrazolidone | 1.2 g |
| 5-Methylbenzotriazole | 0.05 g |
| Glutaraldehyde | 5 g |
| Potassium bromide | 4 g |
| Water to make | 1 l |
| pH adjusted to | 10.2. |

9. An X-ray photographic image forming system according to claim 8, wherein the fluorescence layer is not substantially colored and has a fluorescence substance content of 25 to 100 $mg/cm^2$.

10. An X-ray photographic image forming system according to claim 8, wherein said contrast transfer function is 0.45 to 1.0.

11. An X-ray photographic image forming system according to claim 8, wherein said average contrast is 3.8 to 4.8.

* * * * *